Figures 1, 2:
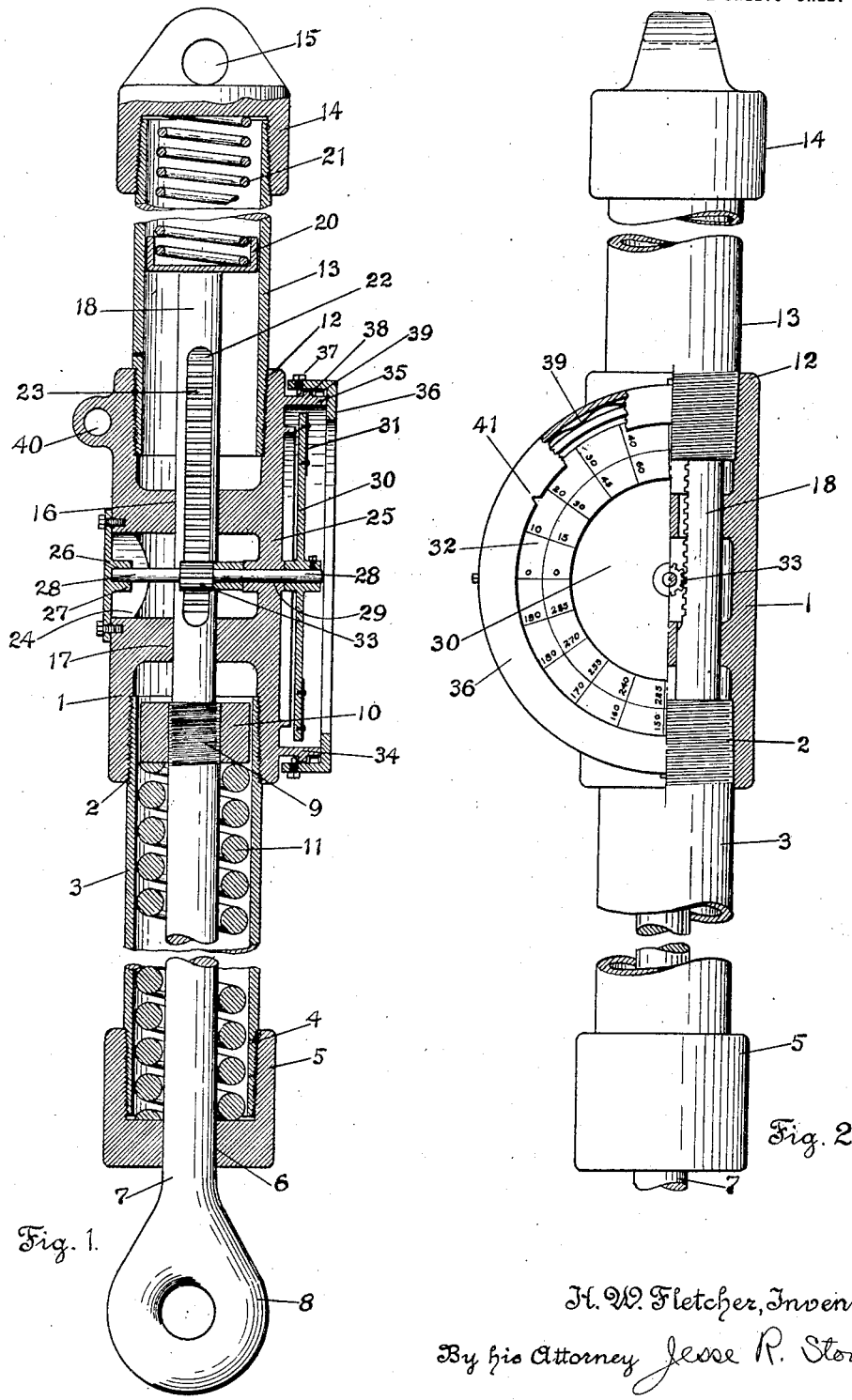

H. W. FLETCHER.
LOAD INDICATOR.
APPLICATION FILED MAR. 18, 1919.

1,333,802.

Patented Mar. 16, 1920.
2 SHEETS—SHEET 1.

H. W. Fletcher, Inventor.
By his Attorney Jesse R. Stone

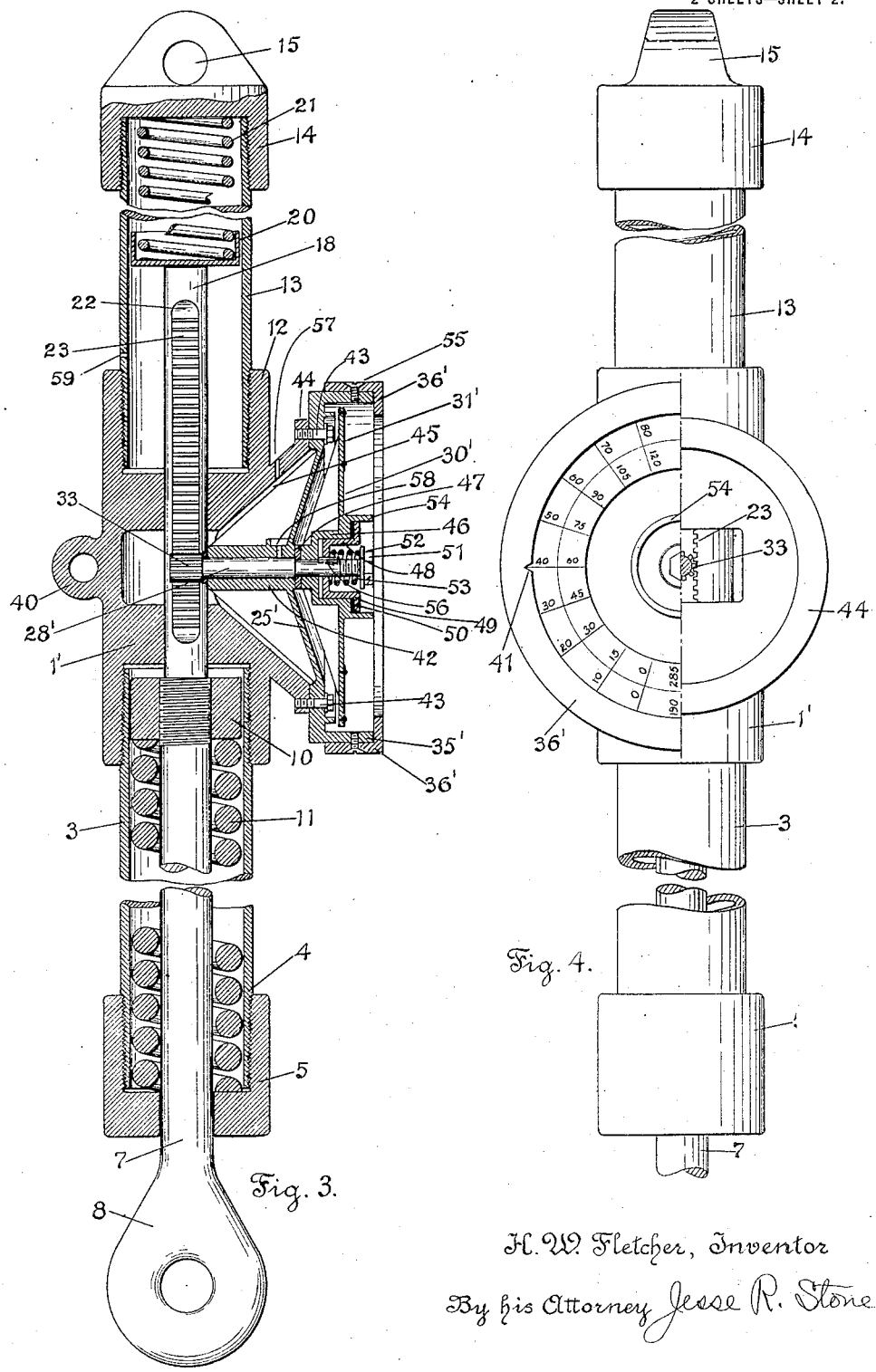

UNITED STATES PATENT OFFICE.

HAROLD W. FLETCHER, OF HOUSTON, TEXAS.

LOAD-INDICATOR.

1,333,802.  Specification of Letters Patent.  Patented Mar. 16, 1920.

Application filed March 18, 1919. Serial No. 283,393.

*To all whom it may concern:*

Be it known that I, HAROLD W. FLETCHER, a citizen of the United States, residing at Houston, Harris county, Texas, have invented a certain new and useful Improvement in Load-Indicators, of which the following is a full, clear, and exact description, such as will enable others skilled in the art to which it appertains to make and use the same.

My invention relates to improvements in load indicators for use in registering the weight which is suspended upon a cable or other sustaining device. It may be used wherever it is to advantage to note the load suspended upon a line but has special application to well drilling for oil, water or gas. It is very difficult in drilling operations to tell when the proper amount of weight is resting upon the drill as it is operating in the bore hole. The string of pipe and the bit at the lower end of the well are suspended by a cable during the operation, said cable running over a crown block at the top of the derrick. The driller operating the drill learns by experience to tell about when the proper weight is resting upon the drill by resting his hand upon the cable and the sustaining drum, but this is a very inaccurate method and only the most experienced drillers can gage the weight, with even a rough degree of accuracy. As the weight of the drill stem above the drill in a deep well is ofttimes excessive and amounts, in most cases, to a number of tons weight, it is necessary, in order that the bit operate correctly, and that the same be not crushed by the excessive weight allowed to rest upon the bit, that a large proportion of the weight of the drill stem, above the drill, be borne by the sustaining cable.

In my co-pending application No. 274,118 filed January 30th, 1919, I have described my preferred method of attaching a load indicator in the load sustaining cable. It is customary to pass the cable from the rotary drum, on which it is reeled, up over the crown block at the top of the derrick and down around the traveling block. It is customarily passed from the crown block two or three times down around the traveling block, the end being again passed over the crown block and back for attachment to the housing of the traveling block, thus allowing five or seven strands supporting the load. The forward end of the cable is usually called the deadline and may be carried down from the crown block for attachment to the mud sill of the derrick. In the use of my invention this arrangement is preferable for the indicator is thereby placed where it may be easily consulted and but a small proportion of the actual weight of the drill stem exerted upon the indicator.

One object of my invention is to provide an indicator which may be easily attached to the cable sustaining the weight of the drill stem to be measured and which will show directly the amount of weight being borne by the drill at the bottom of the well at any time.

Another object is to provide a load indicator, the dial on which may be set at zero when the full weight of the drill is borne by the cable and which will then read directly to show the amount of weight resting upon the drill thereafter. Other objects and advantages will appear in the specification which follows.

Referring to the drawings forming a part of this specification and in which like numerals are applied to like parts throughout the several views, Figure 1 is a central, longitudinal section through my improved load indicator, the central shaft thereof being shown in elevation for the purpose of clearness. Fig. 2 is a side elevation of the same taken at right angles to the view shown in Fig. 1, certain parts being broken away for greater clearness, Fig. 3 is a view similar to that shown in Fig. 1, illustrating a second embodiment of my invention; Fig. 4 is a side elevation at right angles to that shown in Fig. 3; certain parts being broken away.

The body of my improved load indicator is made up of a cylindrical casting 1, having a lower internally threaded nipple 2 thereon, into which is threaded a length of pipe 3. Threaded on to the lower end 4 of the pipe 3 is a cap 5 adapted to close the end of said pipe. A circular opening 6 formed centrally of the cap 5 forms a bearing in which a rod or shaft 7 is adapted to reciprocate. This shaft has an outer eyelet 8 for attachment to a cable or other sustaining means. The upper end of the shaft 7 is threaded at 9 for attachment to the nut 10. The nut 10 and the lower cap 5 of the housing form seats for a helical spring 11 which surrounds the shaft 7 and acts to force the nut 10 and the shaft 7, retained therein, toward the upper end of the housing 3.

At the upper end of the member 1, another internally threaded nipple 12 is formed, into which is threaded a length of pipe 13 forming a housing for other working parts of my device. The upper end of this pipe 13 is threaded into engagement with a closing cap 14 having an upper eyelet 15 for attachment to another section of the cable or similar attaching means.

The central section of the body member 1, is bored along its longitudinal axis to form upper and lower bearings 16 and 17, adapted to receive a shaft 18 somewhat smaller in diameter than the lower shaft 7. This shaft 18 has resting on its upper end a cup shaped head 20 forming a seat for a smaller helical spring 21 which bears at its upper end against the cap 14, thus serving to press the shaft 18 resiliently downward in the housing 13. The lower end of the shaft 18 is adapted to seat upon the upper end of the shaft 7 and is held in engagement therewith by the spring 21. One side of the shaft 18 is recessed or cut away somewhat, at 22, to form a flattened surface upon which are cut the rack teeth 23, these teeth extending downwardly to a point spaced somewhat above the lower end of the shaft.

The central portion of the bearing member 1 is provided with a transverse cylindrical opening or housing 24, closed on one side 25 by the walls of the housing 1, and on the other side by a removable cap 26, the inner face of which is provided with a laterally extending boss 27 forming a bearing for one end of a small transverse pin or shaft 28. The wall 25 is also provided with an opening 29 forming a bearing for the other end of the pin 28. The pin 28 projects a short distance beyond the walls 25 and upon this projecting portion is detachably secured a flattened circular plate, or disk, 30 on the outer margin of which is fastened an annular dial plate 31 provided with graduated scale divisions 32.

The central portion of the shaft 28 is provided with a small pinion 33 fixed on the shaft and meshing with the rack teeth 23 upon the shaft 18. The dial plate 30 is inclosed, except on the forward face, within a circular housing 34 integral with the side walls of the central body portion 1. A laterally projecting annular flange 35 on said housing 34 surrounds the dial plate and an open cover-shaped indexing member 36 fits over the flange 35 and is held in place thereon by means of a number of set screws 37 in the sides thereof, said set screws adapted to fit behind an annular ring or flange 38 on the outer face of the wall 35. Between the flange 38 and the outer edge of the wall 35 is located a leaf spring 39. This spring is sinuous in form and is adapted to exert a resilient pressure upon the flange 35 and the inwardly projecting wall of the indexing member 36, thereby holding the indexing member against accidental rotative movement.

In the operation of this device one end is secured by means of the eyelet 15 to the lower end of the dead line of the cable; the other end is secured by means of the eyelet 8 to another section of cable, through which it is secured to the mud-sill of the derrick. In order that the dial may be set so that it will face inwardly toward the driller at all times, a laterally projecting eyelet 40 is formed on the side of the central member 1. Through this eyelet an anchoring rod is secured, said rod being fastened at the opposite end to the frame work of the derrick in such manner as to hold the face of the dial inwardly toward the driller. It is obvious that the load indicator may be secured in the cable at any desired point, but the same is preferably positioned in the manner described because more convenient of access and because, in this position, it does not sustain the full weight of the drill stem and the bit attached thereto.

When the cable has four strands connecting the crown block with the traveling block, the weight sustained, or force exerted, upon the dead line to which the indicator is secured will be $\frac{1}{4}$ of the full weight of the load sustained by the traveling block. If the said cable is passed three times around the crown block and the traveling block, thereby providing six strands of the cable between the crown block and the traveling block $\frac{1}{6}$ of the weight will be exerted upon the indicator in the position described.

The load, including the total weight sustained by the traveling block, is lifted from the bottom of the well and this load will serve to compress the spring 11 within the housing 3, and when the shaft 7 is thus pulled downwardly in the housing 3 against the action of the spring 11, the spring 21 in the upper housing 13 will exert sufficient pressure upon the shaft 18 to cause this shaft to follow downwardly in its bearing. This movement of the shaft 18 will, through means of the pinion 33 and the shaft 28, cause the dial plate 31 to rotate in a clockwise direction in its housing. When the full weight of the drill stem and drill are sustained by the cable, and the dial comes to rest, the indexing portion 36 is rotated by hand against the friction exerted by the spring 39 until the indexing notch 41 comes opposite the zero point upon the scale. The bit and drill stem are then lowered upon the bottom of the well until the proper weight desired rests upon the bit. As the weight is gradually taken off of the cable and part thereof is sustained by the bit on the bottom of the well, the dial 30 will rotate backwardly again in a counter-clockwise direction. The dial is so numbered that the amount of the released weight will read directly. The weight sustained by the bit at all times can therefore be read directly upon the scale 32 of the dial. As shown in Fig. 2 the amount of weight resting upon the drill when there are four strands of the cable between the crown block and the traveling block would be read upon the outer circle of the dial; and when as shown in this view, would be slightly over 1800 lbs. If, however, there were six strands of cable between the crown block and the traveling block the reading would be upon the scale on the inner circle of the dial and the reading would then be slightly over 2700 lbs.

It is obvious that when the indexing point 41 has been set at zero of the scale, as the entire load is sustained upon the cable, then the amount of weight subsequently borne by the bit will be the reading upon the scale at any time. It will therefore be possible for the driller to lower the cable until the exact weight desired rests upon the drill and this weight may be maintained with a fairly delicate degree of accuracy. By the use of this device, even an inexperienced driller can tell at once what weight is being borne by the bit and it will thus be possible to have the proper weight resting upon the bit at all times.

The shaft 18 is made separate from the shaft 7 instead of integral therewith in order that any sudden dropping or jerking of the load upon the cable will not affect disastrously the mechanism connected with the dial, the dial being actuated in its clockwise rotation only by the force of the spring 21 which may be just sufficient to cause the shaft 18 to move downward into contact with the upper end of the shaft 7.

In the modification shown in Figs. 3 and 4 the lower and upper housings 3 and 13 and the shafts 7 and 18 respectively therein, are arranged in the same manner as disclosed in Figs. 1 and 2. The central housing or body member 1' is formed somewhat differently, however, to accommodate a different arrangement of the registering means used with this modification. The shaft 28' upon which the registering dial 30' is mounted is supported within a removable bearing member 42, said bearing being formed integral with an outwardly flaring housing 25' provided at its outer periphery with an outwardly extending flange 35' over which is fitted a cover-shaped indexing member 36'. The removable bearing 42 and the outer housing member 35' are secured within a conical-shaped recess in the side of the central housing 1' by means of set screws 43, 43 which pass through the outer housing member 35' and the outer face 44 of the conical-shaped seat 45 of the central housing member 1'. The inner end of the shaft 28' is provided with a pinion 33, adapted to mesh with the rack teeth 23 upon the shaft 18 as in the previous modification. The dial 31' is secured to the dial plate 30' as in the previous modification. The dial plate 30' is, however, provided with a central inwardly extending bearing portion 46, through which the outer end of the pin 28' fits. Between the bearing member 46, and the outer end of the inner bearing member 42 is fitted an anti-friction washer 47. The outer reduced end of the pin 28' fits within a friction brake drum which is shaped to fit closely within the inwardly projecting bearing portion 46 of the dial plate. The outer edge of the brake drum member 48 is provided with an annular outwardly extending flange 49 between which and the central portion of the dial plate 30' is fitted a brake band 50. The outer end of the pin 28' is provided with a nut 51 and a washer 52 which forms a seat for a helical spring 53, this spring bearing at its inner end against the brake member 48 serving to hold the same resiliently against the brake band 50. The brake member 48 is held non-rotatably upon the pin 28' by means of a key 56 upon which the said brake drum is slidable. Immediately around the outer edge of the flange 49 of the brake member is a forwardly projecting flange 54, which is preferably roughened somewhat on the outer surface to provide a hold for turning the dial plate 30' against the action of the brake member 48, this flange 54, being integral with the said dial member 30'. The outer registering member 36' in this modification is fixed rigidly to the housing member 35' by means of setscrews 55. Lubrication may be supplied to this device through the openings 59 in the side of the housing 13, this lubrication acting to pass downwardly around the shafts 18 and 7 in an obvious manner. The outer dial operating mechanism is lubricated through a small opening 57 in the upper surface of the housing 45, the lubricant in this case being received within the small cup 58 in the upper face of the bearing 42.

In the operation of this modified form, the load indicator is secured upon the cable as in the other modification. The weight or load resting upon the bit at the bottom of the hole is measured in the same manner as described in connection with Figs. 1 and 2. The registering notch 41, however is stationary and the dial itself is turned by gripping the outer flange 54 of the dial plate and turning the dial against the action of the friction brake so that zero of the scale will come directly opposite the notch 41. When the load is then allowed to rest gradually upon the bit at the bottom of the well the weight taken from the cable will be registered upon the dial as before, it being obvious that the pressure of the brake member 48 upon the dial will cause the same to rotate with the shaft 28' under normal conditions. It will thus be noticed that this modification is the same in principle as that disclosed in the previous embodiment, the difference being that, in this modification, the dial may be turned upon the pin, when necessary to set the same at zero, while the total weight of the drill and drill stem are sustained by the cable.

This type of indicator has the advantage of being adjustable so that the weight resting upon the bit may be read at any time as the drilling operation proceeds. Extra lengths of drill stem are added at intervals, thereby gradually increasing the weight sustained by the cable. But each time the bit and drill stem go into the hole, the total weight thereof will be allowed to rest upon the cable and the dial of the indicator will be set so that zero will be opposite the registering notch 41. Thereafter the amount of weight taken off the cable and borne by the bit at the bottom of the well will read directly upon the dial of the indicator, thus making it possible to learn the weight resting upon the drill at all times. The difficulty ordinarily experienced of overloading the drill and thereby causing excessive wear and breakage of the parts of the drill will be avoided.

Having thus described my invention the advantages of which will be clear without further description, what I claim as new and desire to protect by Letters Patent is:

1. In a load indicator, a longitudinal housing, a lower shaft therein, said shaft having a compression spring thereon, an upper shaft resting on said lower shaft, means holding said upper shaft resiliently against said lower shaft, a transverse spindle rotatable by said upper shaft, a dial on said spindle, an indexing means outside said dial and means to cause the zero point on said dial to register with said indexing means when the load is sustained by said lower shaft, and means on said dial to indicate directly the amount of load released thereafter.

2. In a load indicator, a housing, a spring pressed shaft in the lower portion thereof, an upper shaft, means to hold said upper shaft resiliently against the upper end of said lower shaft, a rack thereon, a transverse spindle, a pinion thereon meshing with said rack, a dial on the outer end of said spindle, a friction means to hold said dial rotatably with said shaft, and an indexing means outside said dial.

3. In a load indicator, a longitudinal housing, a compression spring in the lower portion thereof, a shaft reciprocable against the action of said spring, a transverse spindle in said housing, a dial plate rotatable with said spindle, means actuated by said shaft and said spring to rotate said spindle and means adjustable relative to said shaft to set said dial at zero when desired irrespective of the amount of load sustained.

4. In a load indicator, a compression spring, a shaft reciprocable against the action of said spring, a second shaft, means to hold said second shaft resiliently against said first shaft, a dial, a graduated scale thereon, an index, means adjustable relative to said shafts to set the zero point of said scale to register with said index and means operated by said second shaft to rotate said dial to indicate directly the weight released from said first named shaft when the load is sustained by said shaft.

5. A load indicator, comprising a housing, a load supporting shaft therein, means to normally force said shaft upwardly in said housing, an indicator shaft resting on said load shaft, means to hold said indicator shaft resiliently downward, a dial, connecting means between said indicator shaft and said dial to rotate said dial when a load is sustained on said load shaft, means to set said dial at zero when the load is supported by said shaft, said dial being so calibrated and numbered as to indicate directly thereafter the amount of load released from said load shaft.

6. In a load indicator, the combination of a housing, a load shaft, means to hold said load shaft resiliently upward in said housing, an upper shaft resting on said load shaft, a spring holding said upper shaft against said load shaft, a rack on said upper shaft, a transverse spindle, a pinion thereon meshing with said rack, a dial on the outer end of said spindle, friction means to hold said dial rotatably on said spindle, and an indexing means outside said dial whereby said dial may be set at zero when a load is sustained by said load shaft, said dial being so graduated and numbered as to indicate directly the amount of load released thereafter.

7. In a load indicator, the combination of a load shaft, a spring to sustain said shaft, an indicator shaft, means to hold said indicator shaft against said load shaft, a dial, means connected with said indicator shaft to rotate said dial when a load is placed on said load shaft, an index outside said dial and friction means whereby said dial may be set to zero relative to said index, said dial being graduated to read directly the amount of load thereafter released.

In testimony whereof, I hereunto affix my signature this the 13 day of March, 1919.

HAROLD W. FLETCHER.